United States Patent
Hari et al.

(10) Patent No.: US 9,525,350 B2
(45) Date of Patent: Dec. 20, 2016

(54) CASCADED BUCK BOOST DC TO DC CONVERTER AND CONTROLLER FOR SMOOTH TRANSITION BETWEEN BUCK MODE AND BOOST MODE

(71) Applicant: Texas Instruments Incorporated, Dallas, TX (US)

(72) Inventors: Ajay Karthlk Hari, Scottsdale, AZ (US); Takayasu Sato, Cupertino, CA (US); Neil Jose Gutierrez, Scottsdale, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/315,381

(22) Filed: Jun. 26, 2014

(65) Prior Publication Data

US 2015/0381039 A1    Dec. 31, 2015

(51) Int. Cl.
G05F 1/24 (2006.01)
H02M 3/158 (2006.01)
H02M 1/15 (2006.01)
H02M 1/00 (2006.01)

(52) U.S. Cl.
CPC ............ *H02M 3/1582* (2013.01); *H02M 1/15* (2013.01); *H02M 2001/0025* (2013.01)

(58) Field of Classification Search
CPC .... H02M 3/156; H02M 3/1588; H02M 3/157; H02M 3/1582; H02M 3/1584; G05F 1/67
USPC ........ 323/222, 271, 282–285, 259, 272, 299
See application file for complete search history.

(56) References Cited

U.S. PATENT DOCUMENTS

| | | | |
|---|---|---|---|
| 5,528,125 A | 6/1996 | Marshall et al. | |
| 7,256,570 B2* | 8/2007 | Zhou | H02M 3/156 323/224 |
| 7,595,616 B2 | 9/2009 | Prexl et al. | |
| 7,633,336 B2 | 12/2009 | Bean et al. | |
| 7,902,807 B2 | 3/2011 | Keskar et al. | |
| 8,415,937 B2 | 4/2013 | Hester | |
| 8,436,592 B2 | 5/2013 | Saitoh | |
| 8,749,215 B2 | 6/2014 | Hester | |
| 2006/0176036 A1* | 8/2006 | Flatness | H02M 3/156 323/282 |
| 2006/0176038 A1* | 8/2006 | Flatness | H02M 3/156 323/282 |
| 2007/0075689 A1 | 4/2007 | Kinder et al. | |

(Continued)

OTHER PUBLICATIONS

"High Efficiency, Synchronous, 4-Switch Buck-Boost Controller," Linear Technology, LTC3789, pp. 1-30.

*Primary Examiner* — Nguyen Tran
(74) *Attorney, Agent, or Firm* — Andrew Viger; Frank D. Cimino

(57) ABSTRACT

Cascaded buck boost DC to DC conversion systems, controllers and methods are presented, in which a buck converter stage is pulse width modulated in a first mode and a boost converter stage is pulse width modulated in a second mode, with the pulse width modulation using a first one of peak current control in valley current control in the first mode, and using the other of peak current control in valley current control in the second mode, and operation is switched between the first and second modes based on an on-time of a low side driver switch of the buck converter stage or the boost converter stage.

16 Claims, 6 Drawing Sheets

(56) References Cited

U.S. PATENT DOCUMENTS

| | | | |
|---|---|---|---|
| 2007/0085519 A1* | 4/2007 | Xu | H02M 3/1588 |
| | | | 323/282 |
| 2007/0210782 A1 | 9/2007 | Prexl et al. | |
| 2008/0303499 A1* | 12/2008 | Chen | H02M 3/157 |
| | | | 323/282 |
| 2011/0187336 A1* | 8/2011 | Wu | G05F 1/10 |
| | | | 323/282 |
| 2012/0126624 A1 | 5/2012 | Hester et al. | |
| 2013/0320949 A1 | 12/2013 | Prexl et al. | |

* cited by examiner

US 9,525,350 B2

CASCADED BUCK BOOST DC TO DC CONVERTER AND CONTROLLER FOR SMOOTH TRANSITION BETWEEN BUCK MODE AND BOOST MODE

FIELD OF THE INVENTION

The present disclosure relates to control of DC to DC converters and more particularly to improved cascaded buck boost DC to DC converters, converter control apparatus and methods.

BACKGROUND

DC to DC converters provide stable regulated output voltages by conversion of DC input voltages to power processors, ASICS, memory, and other circuitry. Various types and forms of DC to DC converters have been developed, including buck converters to provide an output voltage lower than the input voltage, as well as boost converters capable of providing output voltages higher than the input voltage. Buck-boost converters offer the capability of providing a regulated output voltage at a level that can be greater than or less than the input voltage. One form of buck-boost converter is known as a cascaded buck boost converter created by cascading a buck power stage followed by a boost power stage. Cascaded buck boost converters offer higher efficiency and occupy less space than classic buck-boost converter topologies, where the converter operates in a pure buck mode when the input voltage is above the desired output voltage, and operate in pure boost mode when the input voltage is less than the desired output voltage. When the input and output voltages are approximately equal, a four switch buck-boost mode can be used with diagonal switches of an H-bridge configuration being turned on in alternating fashion, but this classical buck-boost mode involves switching all four converter switches in a given cycle, and is therefore inefficient.

So called "buck or boost" operation can be used when the input and output voltages are close to one another, in which a certain number of "buck" cycles are followed by a number of "boost" cycles, etc., in order to improve efficiency over traditional H-bridge type buck-boost operation. However, the number of consecutive buck or boost cycles determines the width of the buck or boost operating band or range, and it is desirable to operate in one mode for only a small number of cycles before switching to the other mode to keep the band narrow and thus reduce undesirable low frequency AC ripple at the output. As the number of consecutive buck or boost cycles is reduced, however, the number of transitions between these modes increases. Moreover, transitioning between buck mode and boost mode when using slope compensation for peak current mode control or valley current mode control causes undesirable output voltage ripple due to wide PWM pulse widths during transition. Thus, reducing the width of the "buck or boost" band will reduce the undesirable low frequency AC ripple, but large pulse widths while transitioning can result in excessive output ripple in the output. For example, a slope compensation ramp is added to the current sense signal in peak current mode control when the pulse width modulation duty cycle is greater than 50%, and the error amplifier output is at a level artificially higher than the peak inductor current. Transitioning from buck mode to boost mode for peak current mode control therefore involves mode change while the slope compensation is large, and changing to boost mode changes the duty cycle to less than 50% in which the slope compensation is small. This results in an excessively long pulse width at the transition, causing output voltage ripple. The same problem exists for valley current control mode operation. Consequently a need remains for improved cascaded buck boost DC to DC converters and control apparatus by which buck or boost transition is smooth and the buck or boost window or band is narrow.

SUMMARY

Various aspects of the present disclosure are now summarized to facilitate a basic understanding of the disclosure by briefly indicating the nature and substance of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. Cascaded buck boost DC to DC converters, pulse width modulation controllers and methods are provided in which buck mode employs one of peak current control and valley current control, and boost mode employs the other of peak current control and valley current control, such that transitions between buck mode and boost mode are done at duty cycles in which the slope compensation is similar for each mode, thereby mitigating output voltage ripple effects associated with the mode transition. In this manner, "buck or boost" mode is used to facilitate efficiency improvements over classical buck-boost operation, the band or range over which buck or boost mode is used can be restricted, and the number of cycles using the individual modes can be made small to control low-frequency ripple at the converter output by using different current control types for the buck and boost cycles to mitigate ripple during transitions.

A cascaded buck boost DC to DC converter and a control circuit for a cascaded buck boost DC to DC converter are provided in certain aspects of the disclosure. The converter includes first and second converter circuits with corresponding switching nodes and an inductor coupled between the switching nodes. A dual mode control circuit includes a switching control circuit operative to provide complementary pulse width modulated switching control signals to the first converter circuit in a first mode, and to provide pulse width modulated control signals to the second converter circuit in a second mode, and a modulator circuit operative to provide at least one pulse width modulation control signal to the switching control circuit in the first mode using a first one of valley current control and peak current control, and in the second mode using a second one of valley current control and peak current control. In certain embodiments, for example, the modulator circuit uses valley current control in the first mode and peak current control in the second mode to provide the pulse width modulation control signal. A mode control circuit provides a mode control signal to the switching control circuit and the modulator circuit at least partially according to an on-time of a low side switch of one of the first and second converter circuits. In certain embodiments, the mode control signal is provided to change from the first mode to the second mode responsive to a determination that the on-time of the low side switch of the first converter circuit is less than a first threshold, and to change from the second mode to the first mode responsive to a determination that the on-time of the low side switch of the second converter circuit is less than a second threshold. Certain embodiments include a switching circuit to provide an inverted or non-inverted sensing signal from a current sensing circuit to a current sense amplifier according to the mode control signal, and a second switching circuit is operative according to the mode control signal to provide positive or negative voltage error signals for slope compensation in certain embodiments.

Methods are provided in accordance with further aspects of the disclosure for controlling a cascaded buck boost DC to DC converter, including pulse width modulating high and low side switches of a buck converter stage in a first mode, pulse width modulating high and low side switches of a boost converter stage in a second mode, and generating a mode control signal at least partially according to an on-time of one of the low side switches. In certain embodiments, the method includes using a first one of valley current control and peak current control in the first mode, and using a second one of valley current control and peak current control in the second mode. In certain implementations, moreover, the method involves compensating a comparison of a feedback signal and a reference signal with subtractive slope compensation in the first mode, and compensating the comparison with additive slope compensation in the second mode.

DESCRIPTION OF THE DRAWINGS

The following description and drawings set forth certain illustrative implementations of the disclosure in detail, which are indicative of several ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
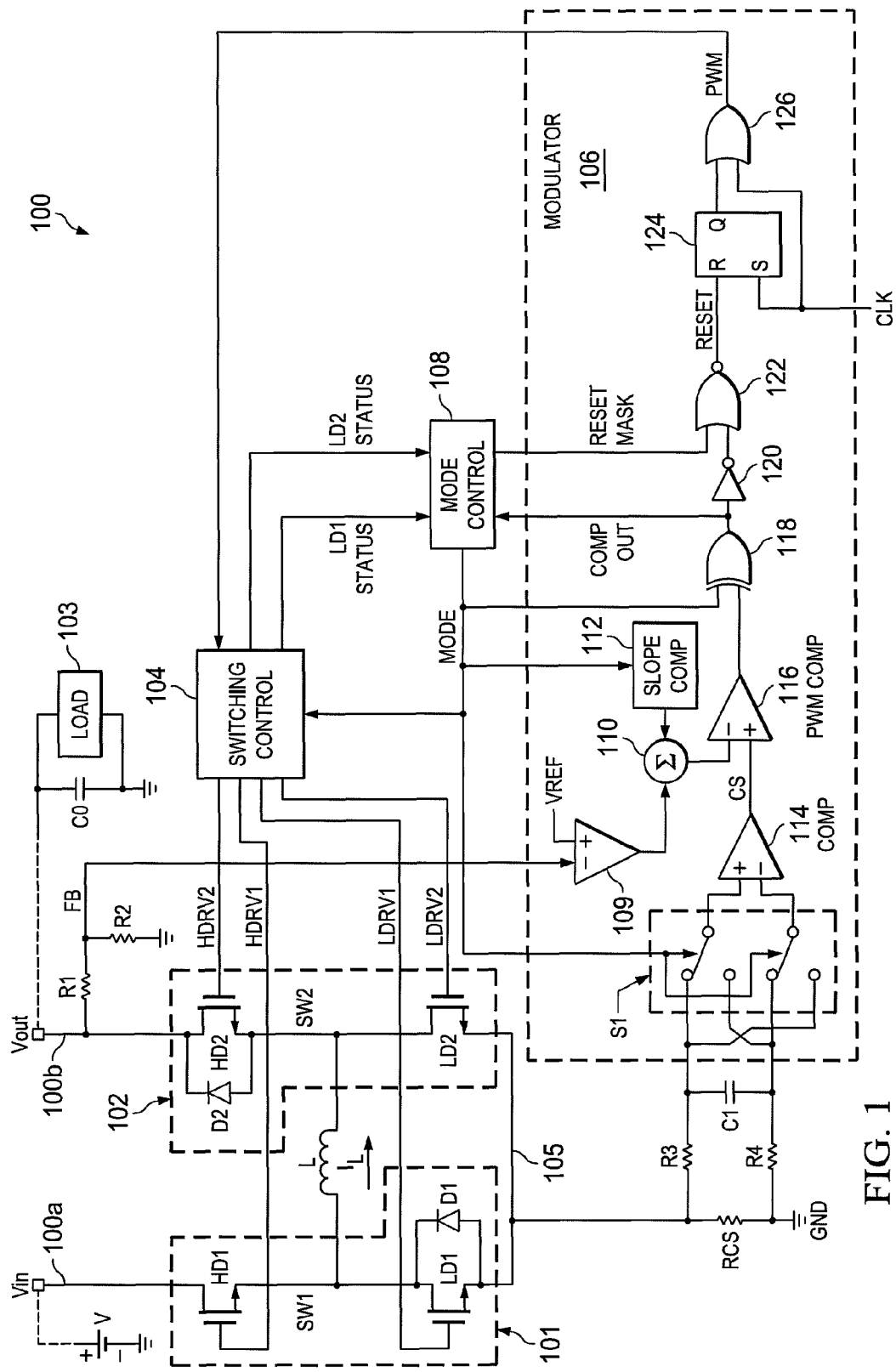
FIG. 1 is a schematic diagram illustrating a cascaded buck boost converter with dual mode switching control and modulator circuitry according to one or more aspects of the present disclosure.

One or more embodiments or implementations are hereinafter described in conjunction with the drawings, wherein like reference numerals are used to refer to like elements throughout, and wherein the various features are not necessarily drawn to scale.

Figure 2:
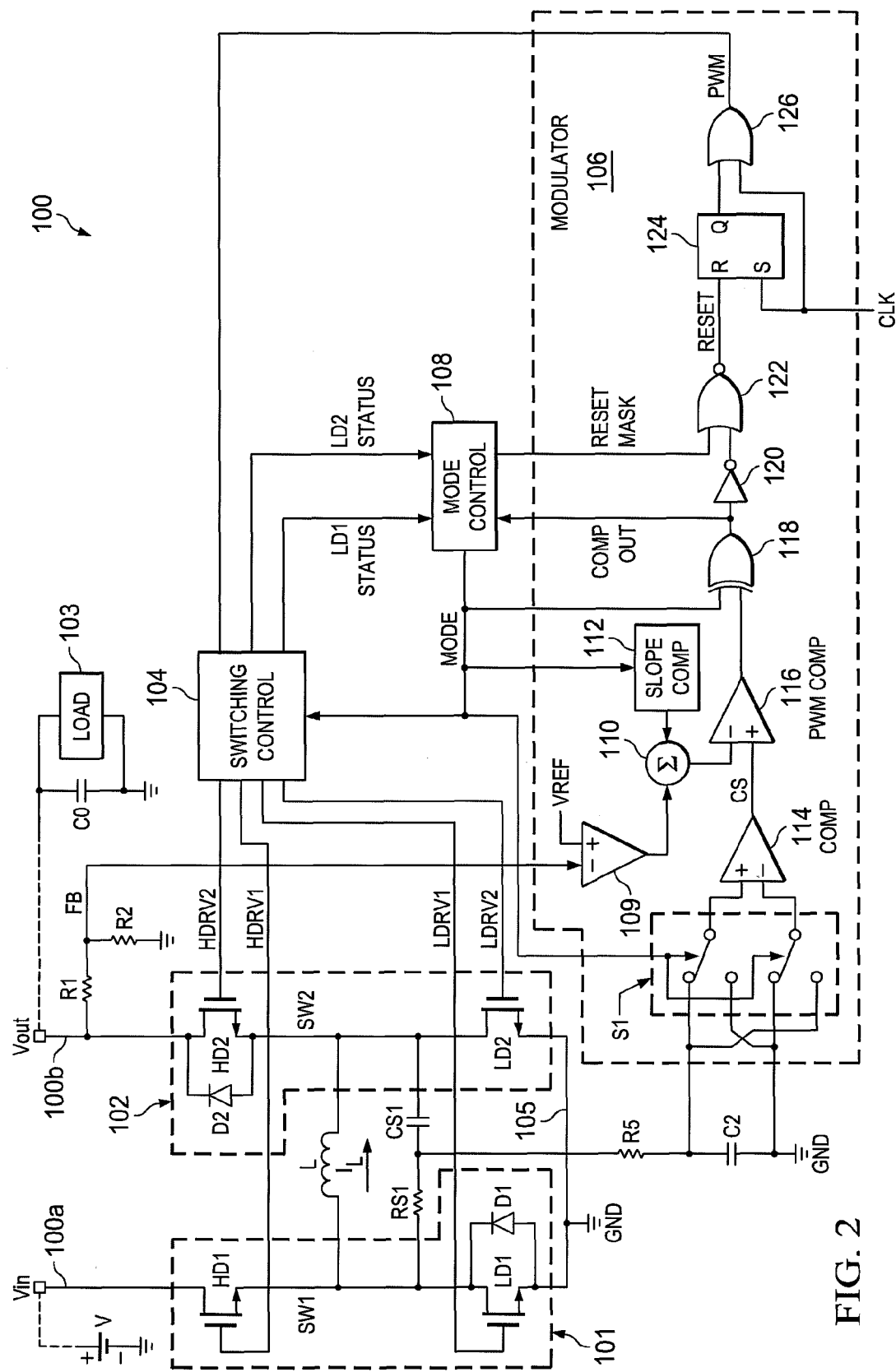
FIG. 2 is a schematic diagram illustrating another cascaded buck boost converter embodiment.

Referring initially to FIGS. 1 and 2, FIG. 1 illustrates a cascaded buck boost DC to DC converter 100 including a first or buck converter stage 101, operable as a buck converter and cascaded with a second or boost converter stage 102 operable as a boost converter. The first converter circuit 101 includes a first switch HD1, in this example an N-channel field effect transistor (NMOS) configured as a high side driver switch coupled between a converter input node 100a receiving an input voltage Vin and a first switching node SW1. A second NMOS switch LD1 operates as a low side buck converter stage driver switch with a parallel connected diode D1 coupled between the node SW1 and an internal node 105. As connected, the switches HD1 and LD1 can be alternately activated and deactivated in complementary fashion via switching control signals HDRV1 and LDRV1, respectively, from a switching control circuit 104 to operate as a buck converter to provide current $I_L$ through an inductor L with a first terminal connected to the first switching node SW1 and a second terminal connected to a second switching node SW2.

In the embodiment of FIG. 1, a current sense resistor RCS is connected between the internal node 105 and a circuit ground GND to provide a sensing signal representing the current $I_L$ flowing in the inductor L as described further below. FIG. 2 shows another non-limiting implementation in which the internal node 105 is ground GND and a current sensing circuit is connected between the switching nodes SW1 and SW2. Complementary pulse width modulation via the signals HDRV1 and LDRV1 provides for control of the voltage at node SW2 at a level less than or equal to the input voltage Vin in the first or buck mode. The first switching node SW1 is alternately switched substantially to the input voltage level Vin when HD1 is on (conductive when activated by a high signal HDRV1) and thus supporting current flow $I_L$ from a connected power supply V at a converter input node 101a through HD1 and the inductor L to the second switching node SW2. SW1 is then switched near the voltage of node 105 when HD1 is off (deactivated) and LD1 is on (activated via high signal LDRV1) with diode D1 allowing current flow $I_L$ to continue from the node 105 through the inductor L.

The second converter circuit 102 provides a buck converter cascaded with the buck stage 101, and includes a third switch HD2 (a second high driver switch), in this case an NMOS device coupled in parallel with a second diode D2 between the second switch node SW2 and a converter output node 100b, along with a fourth NMOS switch or second low driver switch LD2 coupled between the node SW2 and the internal node 105. While the converter stage switches HD1, LD1, HD2 and LD2 are shown as NMOS devices in FIGS. 1 and 2, other suitable switch types and forms can be used in other embodiments, including without limitation PMOS devices, bipolar transistors, IGBTs, or the like or combinations thereof, with the switching control circuit 104 providing suitable signals HDRV1, LDRV1, HDRV2 and LDRV2 to LDRV2 to individually activate and deactivate the switches HD1, LD1, HD2, LD2.

Figure 3:
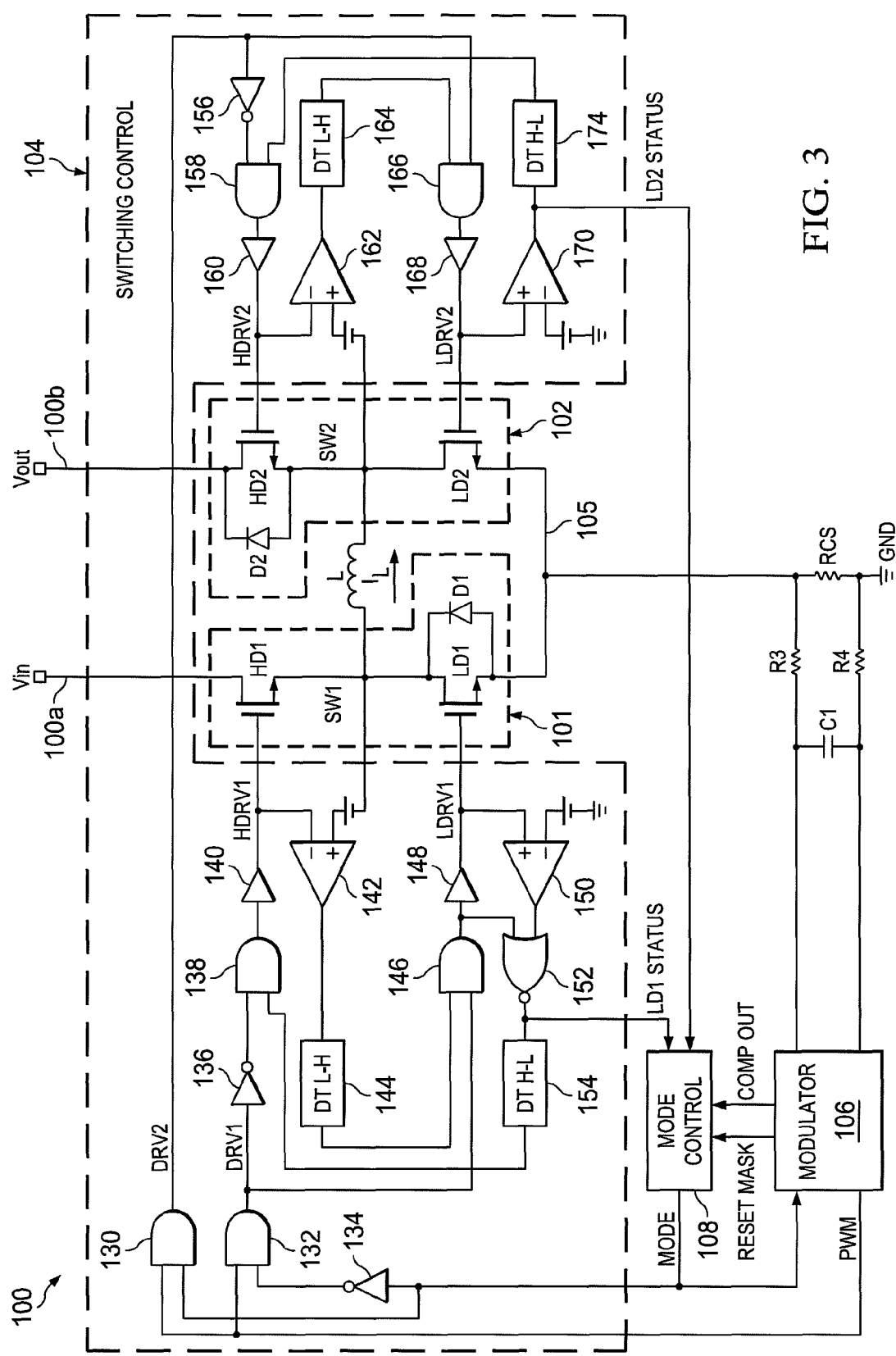
FIG. 3 is a schematic diagram illustrating further details of the switching control circuitry in the converters of FIGS. 1 and 2.

The switching control circuit 104 is a dual mode circuit in the illustrated embodiments, and is operative in a first mode BUCK or a second mode BOOST according to a mode control signal MODE from a mode control circuit 108. Further details of the switching control circuit 104 are shown in FIG. 3 and an example mode control circuit 108 is shown and described further below in connection with FIG. 4. As previously discussed, the switching control circuit 104 is operative in the first or "buck" when the mode control signal MODE is low to provide complementary pulse width modulated signals HDRV1, LDRV1 according to a pulse width modulation control signal PWM from a modulator circuit 106 in order to alternately activate and deactivate the switches HD1 and LD1 as a buck converter while providing a high signal HDRV2 to activate the switch HD2 and while providing a second low side driver control signal LDRV2 to deactivate the switch LD2. In this manner, the output voltage Vout at output terminal 101b of the converter 100 is regulated to a controlled level lower than the input voltage Vin.

In a second (boost) mode with the mode control signal MODE high, the switching control circuit 104 provides the switching control signals HDRV2 and LDRV2 in complementary pulse width modulated fashion according to the control signal PWM to alternately activate and deactivate the switches HD2 and LD2. In this mode, moreover, the switching control circuit 104 provides the first switching control signal HDRV1 (e.g., high) to activate the switch HD1 and provides the second switching control signal LDRV1 (e.g., low) to deactivate the second switch LD1. While HD1 is turned on and LD1 is turned off, the first terminal of the inductor L at the switching node SW1 is approximately at the input voltage level Vin. The voltage at the second switching node SW2 is alternately switched to approximately the voltage of internal node 105 (e.g., near ground in this example) when the low side driver switch LD2 is activated and HD2 is deactivated to conduct current $I_L$ from the input node 101a through the inductor L and the low side switch LD2 to ground GND (e.g., directly in FIG. 2 or through the current sense resistor RCS in FIG. 1), and then node SW2 is brought to approximately the output voltage level Vout when HD2 is activated and LD2 is deactivated. The boost mode thus facilitates output voltage regulation when the input voltage Vin is less than a desired output voltage Vout.

During the first and second modes, the pulse width modulation of the corresponding stage 101 or 102 is done in closed loop fashion to regulate the output voltage Vout via one or more pulse width modulation control signals PWM from the modulator circuit 106. While the illustrated modulator circuit 106 provides a single output signal PWM, other embodiments are possible in which multiple pulse width modulation control signals are provided, for instance, separate PWM signals provided to the first and second converter stages 101 and 102. As seen in FIGS. 1 and 2, the modulator 106 receives an output voltage feedback signal FB from a resistive divider circuit formed by resistors R1 and R2, and also receives a sense signal from a current sensing circuit for peak or valley type current mode control in operating the converter 100.

In operation, the modulator circuit 106 provides the control signal PWM to the switching control circuit 104 with an on-time and/or off-time controlled at least partially according to a comparison of the feedback signal FB and a reference signal VREF representing a desired output voltage via an error amplifier 109 to generate an error output. The output from the error amplifier 109 is compensated by a summing circuit 110. The summing circuit 110 provides a compensated error signal COMP by summing the error output signal and a slope compensation signal provided by a slope compensation circuit 112 according to the difference between the output voltage Vout and the input voltage Vin. The compensated signal COMP is provided to a PWM comparator 116 for comparison with a current sense signal CS.

In the embodiment of FIG. 1, a current sensing circuit is formed by the sense resistor RCS connected between the internal node 105 and the circuit ground GND to provide a voltage signal through an RC circuit formed by resistors R3, R4 and a capacitor C1 representing the current flowing through the sense resistor RCS. During pulse width modulated operation of the buck converter stage 101 in the first mode, the inductor current $I_L$ flows from ground GND through the sense resistor RCS and the first low side switch LD1, whereby the voltage across RCS represents the inductor current $I_L$. Also, during boost operation in the second mode, the inductor current $I_L$ flows through the sense resistor RCS when the second low side switch LD2 is on, whereby the inductor current is represented by the sensing signal provided by the voltage across the resistor RCS. Another non-limiting current sensing circuit example is shown in the embodiment of FIG. 2, in which the internal node 105 is connected to the circuit ground GND. In this case, an RC circuit including resistor RS1 and capacitor CS1 is connected between the first and second switching nodes SW1 and SW2, with a second RC circuit formed by resistor R5 and capacitor C2 provides a sensing signal to the modulator circuit 106 representing the current $I_L$ flowing in the inductor L.

The modulator circuit 106 includes a first switching circuit S1 coupled with the current sensing circuitry, which operates according to the mode control signal MODE to selectively provide an inverted sensing signal or a non-inverted sensing signal to the input terminals of a current sense amplifier 114. The amplifier 114 provides the current sense signal CS to the PWM comparator 116 representing the inductor current $I_L$ flowing in the inductor L according to the inverted or non-inverted sensing signal from the first switching circuit S1. In the illustrated examples, the switching circuit S1 provides a non-inverted sense signal to the current sense amplifier 114 in the first (buck) mode, and provides an inverted sense signal to the amplifier 114 in the second (boost) mode according to the MODE signal.

Figure 5:
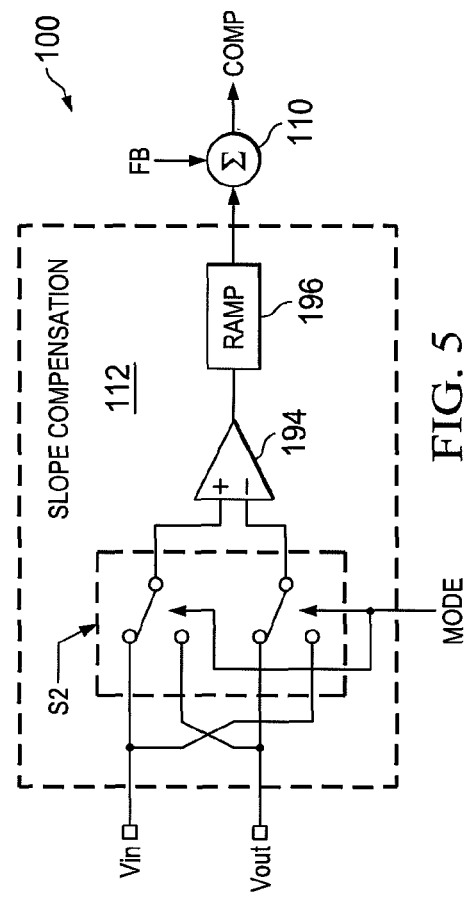
FIG. 5 is a schematic diagram illustrating details of a slope compensation circuit in the converter of FIGS. 1 and 2.

FIG. 5 illustrates further details of a slope compensation circuit embodiment, in which first and second amplifier inputs of a slope compensation circuit amplifier 194 receive the input and output voltage signals via a switching circuit S2. The amplifier 194 provides an output to a ramp circuit 196 to generate the slope compensation signal provided to the summation circuit 110. The switching circuit S2 operates according to the MODE signal to selectively couple the input voltage signal to the non-inverting amplifier input and the output voltage signal to the inverting input of the amplifier 194 in the first (buck) mode, and to switch the amplifier input signals in the second (boost) mode according to the MODE signal.

As seen in FIGS. 1 and 2, the PWM comparator circuit 116 provides a pulse width modulation comparison signal PWM COMP according to a comparison of the compensated error signal COMP with the current sense signal CS, and the modulator circuit 106 provides the control signal PWM to the switching control circuit 104 at least partially according to the pulse width modulation comparison signal PWM COMP. In the illustrated embodiments, the comparison signal PWM COMP is provided as an input to an exclusive OR (XOR) gate 118 having a second input connected to the MODE signal from the mode control circuit 108, and the gate 118 provides an output COMP OUT to the mode control circuit 108. The COMP OUTPUT signal is inverted via an inverter 120 and provided as an input to a NOR gate 122 along with a RESET MASK signal from the mode control circuit 108, with the NOR gate 122 providing a RESET output signal as an input to the reset (R) input of an R-S flip-flop 122. The set (S) input of the flip-flop 124 is connected to a clock signal CLK, and the data output (Q) from the flip-flop 124 is provided as an input to an OR gate 126. The second input of the OR gate 126 is connected to receive the clock signal CLK, and provides the PWM output to the switching control circuit 104 as shown in FIGS. 1 and 2. The modulator circuit 106 thus operates to provide the PWM signal with a controlled on-time or off-time according to the error between the feedback signal FB and the reference signal VREF with slope compensation via the slope compensation circuit 112 and peak or valley type current control via the current sense circuitry and the PWM comparator 116 in the first or second mode.

Moreover, the modulator circuit 106 is operative in the first mode BUCK to provide the signal PWM using a first one of valley current control in one of the first and second modes and peak current control in the other of the first and second modes, thereby avoiding or mitigating output voltage ripple effects during transitions between buck operation and boost operation. As discussed above, this allows narrowing of the band of "buck or boost" operation thereby facilitating reduction in low-frequency output voltage ripple of the cascaded buck boost converter 100. Moreover, as discussed further below, certain embodiments facilitate improved buck or boost operation of the converter 100 by the mode control circuit 108 providing the mode control signal MODE at least partially according to an on time $T_{ONLD1}$ or $T_{ONLD2}$ of one of the low side switches LD1 and LD2. For example, the switching control circuit 104 in FIGS. 1 and 2 provides low side driver status signals LD1 STATUS and LD2 STATUS to the illustrated mode control circuit 108 for use in generating the mode control signal MODE.

Referring also to FIG. 3, further details of a switching control circuit embodiment 104 are illustrated, for the case in which the modulator circuit 106 employs valley current control in the first (buck) mode and peak current control in the second (boost) mode. As previously noted, other embodiments are possible in which peak current control is provided by the modulator circuit 106 in the first (buck) mode and valley current control is used in the second (boost) mode. As seen in FIG. 3, the switching control circuit 104 receives the PWM signal from the modulator circuit 106 and the MODE signal from the mode control circuit 108, with a first AND gate 130 receiving the PWM and MODE signals as inputs and provides an output DRV2 for driving the second (boost) converter stage 102. A second AND gate 132 receives the PWM signal and an inverted MODE signal via an inverter 134 to provide an output DRV1 to drive the first (buck) converter stage 101. In the first mode (boost), the MODE signal is low, and the first AND gate provides a low output DRV2 by which the second high side switch HD2 is activated (on) and the second low side switch LD2 is deactivated (off).

In this first (buck) mode, the AND gate 132 passes the pulse width modulated PWM signal from the modulator circuit 106 as the DRV1 signal to an inverter 136 and an AND gate 138 whose output controls a driver 140 providing the gate control signal HDRV1 to the NMOS first high side switch HD1 of the buck converter stage 101. This drive signal HDRV1 is compared with a DC reference by a comparator 142 whose output is provided to a delay time low-to-high (DT L-H) circuit 144 whose output is provided along with the DRV1 signal to an AND gate 146. The output of the AND gate 146 controls a low side driver 148 providing the buck converter low side drive signal LDRV1 to the gate of LD1. The LDRV1 signal is compared to a DC reference by a comparator 150 whose output is connected as an input to a NOR gate 152 with a second input receiving the output from the AND gate 146 as shown in FIG. 3. The output of the NOR gate 152 is provided as a status signal LD1 STATUS to the mode control circuit 108, and generally has a signal width corresponding to the on time of the buck converter low side switch LD1. The LD1 STATUS signal is also provided to a delay time high-to-low (DT H-L) circuit 154 providing an output to the second input of the high side driver circuit AND gate 138. The buck converter driver circuitry thus provides pulse width modulated operation of the switches HD1 and LD1 in complementary alternating fashion, with delay times ensuring that both switches are not activated at the same time, and also provides the LD1 STATUS signal to the mode control circuit 108 for assessment of the low side switch on time as discussed further below.

FIG. 3 further illustrates operation in the second (boost) mode. The MODE signal is high in the boost mode, thus setting the output of the AND gate 132 low, with the buck converter high side switch HD1 being thereby activated (on) and the low side switch LD1 being deactivated (off). Moreover, the AND gate 132 passes the PWM signal as the second or boost converter stage drive signal DRV2 for pulse width modulated operation of the boost converter stage 102. DRV2 is inverted by an inverter 156 and provided as an input to an AND gate 158 providing a signal to a second high side driver 160 to control the gate terminal of the boost converter stage high side switch HD2 via signal HDRV2. The level of the HDRV2 is compared with a DC voltage via a comparator 162 whose output is provided to a delay time low-to-high circuit 164 for providing a delayed signal to an AND gate 166. The gate 166 also receives the DRV2 signal and provides an output to a low side driver 168 for generating the low side drive signal LDRV2 to control the gate of the low side switch LD2. The level of the LDRV2 is compared with a DC reference voltage by a comparator 170, whose output provides the boost converter low side driver status signal LD2 STATUS to the mode control circuit 108 and to another delay time high-to-low circuit 174 whose output is provided as an input to the AND gate 158. The PWM signal from the modulator circuit 106 thus provides complementary pulse width modulation control of the high and low side switches HD2 and LD2 of the boost converter stage 102 for boost mode operation while HD1 remains activated and LD1 is deactivated.

Figure 6:
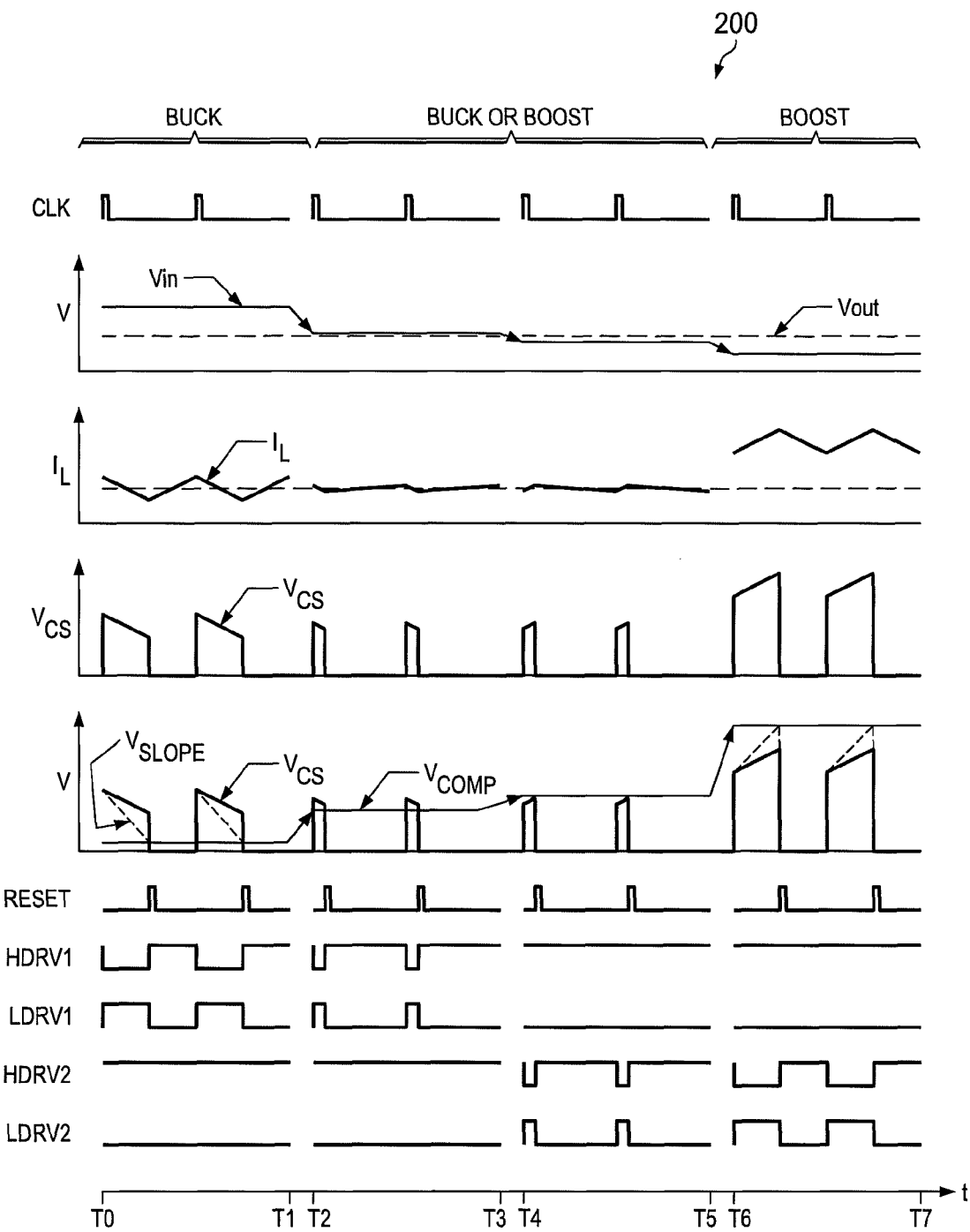
FIG. 6 is a waveform diagram illustrating various signals during buck, buck or boost, and boost mode operation in the converters of FIGS. 1 and 2.

FIG. 6 illustrates a graph 200 showing various waveforms in the converter 100 of FIGS. 1-5, including the clock signal CLK which can be provided from an internal or external source in various embodiments. The example of FIG. 6 shows an input curve Vin as well as an output voltage curve Vout, with the converter 100 initially operating in buck mode from time T0 through T1 when the input voltage is significantly higher than the output voltage, operating in a boost mode from T6 through T7 when the output voltage Vout is significantly higher than the input voltage Vin, and operating in "buck or boost" mode operation (e.g., buck operation from T2 through T3, and boost operation from T4 through T5 in FIG. 6) according to the low side switch on time associated with a pulse width modulated converter stage.

As seen in FIG. 6, the inductor current $I_L$ has a generally triangular or ramped waveform, with the current sense signal CS having a voltage $V_{CS}$ with a negative or downward slope during buck operation and a rising or upward slope during boost operation by the operation of the first switching circuit S1 (FIGS. 1 and 2 above). Moreover, the slope compensation $V_{SLOPE}$ is shown in dashed line along with the $V_{CS}$ waveform and a compensation voltage curve $V_{COMP}$, with the RESET pulse signal being asserted (low-to-high transition) in the modulator circuit 108 using valley current control when the $V_{SLOPE}$ equals the compensation voltage signal $V_{COMP}$. FIG. 6 further illustrates the drive signals HDRV1, LTRV1, HDRV2 and LTRV2. As seen in FIG. 6, therefore, the converter 100 provides valley control during buck operation and peak current control during boost operation, with the buck mode PWM cycles beginning with the CLK signal to activate LD1 and deactivate HD1, and with the modulator circuit 106 turning HD1 on and turning off LD1 based on the reset pulses RESET for valley current control. During boost mode, in contrast, peak current control is implemented by the modulator circuit 106, with HD2 being turned off and LD2 being turned on at the clock signal CLK, and with HD2 being turned on and LD2 being turned off based on the rising edge of the RESET pulses responsive to the peak of the slope compensated signal reaching the $V_{COMP}$ voltage.

Figure 4:
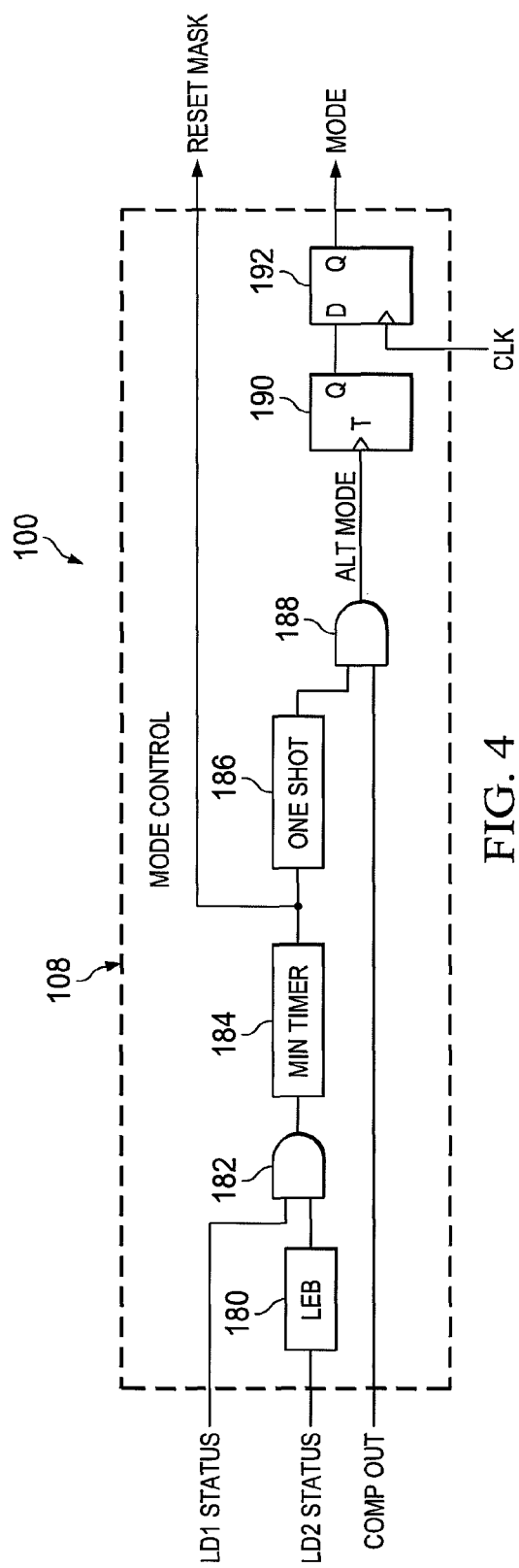
FIG. 4 is a schematic diagram illustrating details of a mode control circuit in the converter of FIGS. 1 and 2.
Figure 7:
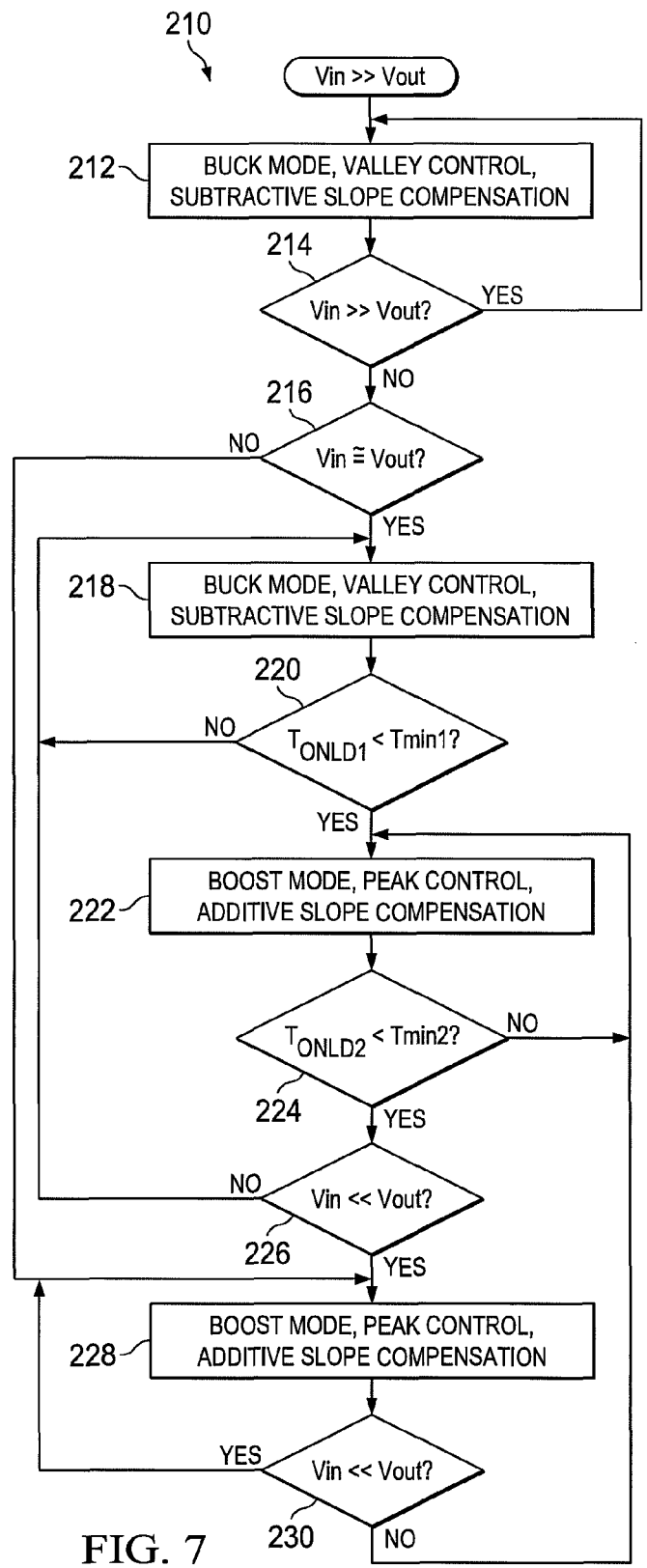
FIG. 7 is a flow diagram illustrating a process for controlling a cascaded buck boost DC to DC converter in accordance with further aspects of the disclosure.

Referring now to FIGS. 4 and 7, an embodiment of the mode control circuit 108 is illustrated in FIG. 4, which receives the LD1 STATUS and LD2 STATUS signals from the switching control circuit 104 and provides the mode control signal MODE at least partially according to the on time $T_{ONLD1}$ and $T_{ONLD2}$ of one of the low side switches LD1 and LD2. As seen in FIG. 4, the LD2 STATUS signal is extended via a circuit 180 whose output is provided along with the LD1 STATUS signal as inputs to an AND gate 182. The AND gate 182 provides an input signal to a minimum timer circuit 184 whose output is provided as the RESET MASK signal to the NOR gate 122 of the modulator circuit 106 (FIGS. 1 and 2 above). The RESET MASK signal is also provided as an input to a one shot circuit 186 which provides a pulse output signal to an AND gate 188. The COMP OUT signal from the exclusive OR gate 118 of the modulator circuit 106 is provided as a second input to the AND gate 188 of the mode control circuit 108, and the output of the AND gate 188 is provided as an alter mode (ALT MODE) signal to the input of a toggle (T) flip-flop 190. The data output (Q) of the flip-flop 190 is provided as an input to the data (D) input of a clocked D flip-flop 192 providing the MODE signal output to the switching control circuit 104 and to the modulator 106.

FIG. 7 illustrates a process or method 210 for controlling a cascaded buck boost DC to DC converter, such as the converter 100 illustrated and described above. In general, the method 210 involves controlling the converter 100 in a first mode by pulse width modulating the switches of a buck converter stage (e.g., stage 101 above) in alternating fashion, and pulse width modulating switches of a boost converter stage (stage 102) in a second mode, as well as generating a mode control signal according to an on time of the low side switch of the pulse width modulated stage. The process 210 is illustrated in FIG. 7 beginning with the condition (e.g., T0 through T1 in FIG. 6) where the input voltage Vin is significantly higher than the output voltage Vout. At 212 in FIG. 7, buck mode operation is implemented, in one example using valley current control and subtractive slope compensation as seen in the above embodiments. A determination is made at 214 as to whether the input voltage continues to be significantly higher than the output voltage, and if so (YES at 214), the process 210 continues at 212 for buck mode operation. Otherwise (NO at 214) a determination is made at 216 as to whether the input and output voltages are approximately equal. If not (NO at 216), the process proceeds to 228 as discussed further below.

If the input and output voltages are close to one another (YES at 216) the converter 100 implements "buck or boost" operation (e.g., T2 through T5 in FIG. 6 above), and initially continues buck mode operation at 218 using valley current control and subtractive slope compensation. A determination is made at 220 as to whether the on time of the pulse width modulated buck converter stage low side driver (LD1 above) is less than a first threshold Tmin1. If not (NO at 220), buck mode operation continues at 218, and if so (YES at 220) the mode control circuit 108 of FIG. 4 changes the operating mode to boost mode operation (e.g., by setting the MODE signal high in the above examples), and the converter 100 implements boost mode operation with peak current control and additive slope compensation at 222. A determination is made at 224 as to whether the on time of the now-pulse width modulated low side switch LD2 of the boost converter stage 102 is less than a second threshold Tmin2. If not (NO at 224), the process continues at 222, and otherwise (YES at 224), a determination is made at 226 as to whether the input voltage is significantly less than the output voltage. If not (NO at 226), the process 210 returns to buck mode at 218 via the MODE signal being changed by the mode control circuit 108. If the input voltage is significantly less than the output voltage (YES at 226), the converter 100 operates in normal boost mode at 228, in one example using peak current control and additive slope compensation. A determination is made at 230 as to whether the input voltage continues to be significantly less than the output voltage, and if so (YES at 230), the boost mode operation continues at 228. Otherwise (NO at 230), the boost mode operation continues at 222 with the mode control circuit 108 implementing the "buck or boost" operation according to the on time of the pulse width modulated low side switch LD2 or LD1. It is noted that two different thresholds Tmin1 and Tmin2 can be used in certain embodiments, and that the mode control circuit 108 of FIG. 4 implements a single threshold via the minimum timer circuit 184 effectively employed as the minimum on time threshold for both LD1 and LD2 to implement the control mode switching.

As seen above, the embodiments provide cascaded buck boost DC to DC converters, PWM controllers therefor, and methods in which buck mode employs one of peak current control and valley current control, and boost mode employs the other of peak current control and valley current control. In this manner, transitions between buck mode and boost mode are done at duty cycles in which the slope compensation is similar for each mode, whereby output voltage ripple effects associated with the mode transition can be controlled or mitigated. In addition, the band over which "buck or boost" mode is used can be controlled, for example, using minimum on times for low side devices LD1 or LD2 for mode switching, and the number of cycles using the individual modes can therefore be made small to control low-frequency ripple in the converter output voltage Vout. As noted, moreover, the illustrated examples employ valley current control during buck mode operation and peak current control during boost mode operation, but other embodiments are possible using valley current mode for boost and peak current mode for buck mode operation.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A cascaded buck boost DC to DC converter, comprising:
   a four-switch cascaded buck-boost converter circuit, including
      a first switch coupled between a converter input node and a first switching node, and a second switch coupled between the first switching node and an internal node;
      a third switch coupled between a converter output node and a second switching node, and a fourth switch coupled between the second switching node and the internal node;
   a switching control circuit operative, in response to at least one pulse width modulation control signal, to provide respective switching control signals to individually activate and deactivate the first, second, third and fourth switches in a buck mode or a boost mode according to a mode control signal, including respective complementary pulse width modulated switching control signals, and associated respective activation and deactivation switching control signals corresponding respectively to buck mode operation and boost mode operation;
   a modulator circuit operative to provide the at least one pulse width modulation control signal to the switching control circuit, and to control at least one of an on-time and an off-time associated with the at least one pulse width modulation control signal at least partially according to a comparison of a feedback signal associated with an output voltage of the converter output node and a reference signal representing a desired output voltage,
      the modulator circuit operative in the buck mode to provide the at least one pulse width modulation control signal using a first one of valley current control and peak current control, and in the boost mode to provide the at least one pulse width modulation control signal using the other one of peak current control and valley current control, and
      the modulator circuit operative in the buck mode to provide subtractive slope compensation, and in the boost mode to provide additive slope compensation, with a slope compensation magnitude based on a difference between the output voltage at the converter output node and an input voltage at the converter input node; and
   a mode control circuit operative to provide the mode control signal to the switching control circuit and to the modulator circuit, the mode control circuit operative:
      to change from the buck mode to the boost mode responsive to a determination that the on time of the second switch is less than a first threshold, and
      to provide the mode control signal to change from the boost mode to the buck mode responsive to a determination that the on time of the fourth switch is less than a second threshold,
      such that the slope compensation magnitude is similar for each mode.

2. The converter of claim 1, wherein the first and second thresholds are approximately equal.

3. The converter of claim 1, wherein the first and second switching nodes are coupleable to an inductor external to the converter, and
   further comprising a current sensing circuit coupled with at least one of the first switching node, the second switching node, and the internal node, the current sensing circuit operative to provide a sensing signal representing an inductor current flowing in the inductor; and
   wherein the modulator circuit comprises:
      a first switching circuit coupled with the current sensing circuit, the first switching circuit operative according to the mode control signal to selectively provide an inverted sensing signal or a non-inverted sensing signal,
      a current sense amplifier operative to provide a current sense signal representing an inductor current flowing in the inductor according to the inverted or non-inverted sensing signal from the first switching circuit,
      an error amplifier circuit providing an error output signal at least partially according to comparison of the feedback signal with the reference signal,
      a slope compensation circuit providing a slope compensation signal at least partially according to a difference between the output voltage and an input voltage at the converter input node,
      a summing circuit providing a compensated error signal at least partially according to a summation of the error output signal and the slope compensation signal; and
      a comparator circuit, including:
         a first comparator input coupled to receive the compensated error signal from the summing circuit,
         a second comparator input coupled to receive the current sense signal, and
         a comparator output providing a pulse width modulation comparison signal according to a comparison of the compensated error signal with the current sense signal; and
      wherein the modulator circuit is operative to provide the at least one pulse width modulation control signal to the switching control circuit at least partially according to the pulse width modulation comparison signal.

4. The converter of claim 3, wherein the slope compensation circuit comprises:
   a slope compensation circuit amplifier with first and second amplifier inputs, and an output;
   a ramp circuit providing the slope compensation signal according to the output of the slope compensation circuit amplifier; and
   a second switching circuit operative according to the mode control signal to selectively couple a signal representing the output voltage to one of the first and second amplifier inputs, and to selectively couple a signal representing the input voltage to the other one of the first and second amplifier inputs.

5. The converter of claim 1, comprising a current sensing circuit coupled with at least one of the first switching node, the second switching node, and the internal node, the current sensing circuit operative to provide a sensing signal representing an inductor current flowing in the inductor;
   wherein the modulator circuit comprises:
      a first switching circuit coupled with the current sensing circuit, the first switching circuit operative according to the mode control signal to selectively provide an inverted sensing signal or a non-inverted sensing signal,
      a current sense amplifier operative to provide a current sense signal representing an inductor current flowing in the inductor according to the inverted or non-inverted sensing signal from the first switching circuit, an error amplifier circuit providing an error output signal at least partially according to comparison of the feedback signal with the reference signal, a slope compensation circuit providing a slope compensation signal at least partially according to a difference between the output voltage and an input voltage at the converter input node, a summing circuit providing a compensated error signal at least partially according to a summation of the error output signal and the slope compensation signal;

a comparator circuit, including:
  a first comparator input coupled to receive the compensated error signal from the summing circuit,
  a second comparator input coupled to receive the current sense signal, and
  a comparator output providing a pulse width modulation comparison signal according to a comparison of the compensated error signal with the current sense signal;

wherein the modulator circuit is operative to provide the at least one pulse width modulation control signal to the switching control circuit at least partially according to the pulse width modulation comparison signal.

6. The converter of claim 5, wherein the slope compensation circuit comprises:
  a slope compensation circuit amplifier with first and second amplifier inputs, and an output;
  a ramp circuit providing the slope compensation signal according to the output of the slope compensation circuit amplifier; and
  a second switching circuit operative according to the mode control signal to selectively couple a signal representing the output voltage to one of the first and second amplifier inputs, and to selectively couple a signal representing the input voltage to the other one of the first and second amplifier inputs.

7. A control circuit for controlling a cascaded four-switch buck boost DC to DC converter, the control circuit comprising:
  a switching control circuit operative in a buck mode according to a mode control signal to provide complementary pulse width modulated first and second switching control signals to alternately activate and deactivate first high and low side switches of a buck converter stage to provide buck conversion according to at least one pulse width modulation control signal, while providing to a second high and low side switches of a boost converter stage a third switching control signal to activate the second high side switch and a fourth switching control signal to deactivate the second low side switch, the switching control circuit operative in a boost mode according to the mode control signal to provide the third and fourth switching control signals in complementary pulse width modulated fashion according to the at least one pulse width modulation control signal to alternately activate and deactivate the second high and low side switches, respectively, to provide boost conversion, while providing to the first high and low side switches of the buck converter stage the first switching control signal to activate the first high side switch and the second switching control signal to deactivate the first low side switch;
  a modulator circuit operative to provide the at least one pulse width modulation control signal and to control at least one of an on-time and an off-time associated with the at least one pulse width modulation control signal at least partially according to a comparison of a feedback signal associated with an output voltage of the converter and a reference signal representing a desired output voltage,
    the modulator circuit operative in the buck mode to provide the at least one pulse width modulation control signal using a first one of valley current control and peak current control, and in the boost mode to provide the at least one pulse width modulation control signal using the other one of peak current control and valley current control, and
    the modulator circuit operative in the buck mode to provide subtractive slope compensation, and in the boost mode to provide additive slope compensation, with a slope compensation magnitude based on a difference between the output voltage at the converter output node and an input voltage at the converter input node; and
  a mode control circuit operative to provide the mode control signal to the switching control circuit and to the modulator circuit, the mode control circuit operative:
    to change from the buck mode to the boost mode responsive to a determination that the on time of the second switch is less than a first threshold, and
    to provide the mode control signal to change from the boost mode to the buck mode responsive to a determination that the on time of the fourth switch is less than a second threshold,
    such that the slope compensation magnitude is similar for each mode.

8. The control circuit of claim 7, wherein the modulator circuit is operative in the buck mode to provide the at least one pulse width modulation control signal using valley current control, and in the boost mode to provide the at least one pulse width modulation control signal using peak current control.

9. The control circuit of claim 7, wherein the modulator circuit comprises:
  a first switching circuit operative according to the mode control signal to selectively provide an inverted sensing signal or a non-inverted sensing signal representing an inductor current flowing in the DC to DC converter;
  a current sense amplifier with inputs coupled to the first switching circuit and an output operative to provide a current sense signal according to the inverted or non-inverted sensing signal from the first switching circuit;
  an error amplifier circuit providing an error output signal at least partially according to comparison of the feedback signal with the reference signal,
  a slope compensation circuit providing a slope compensation signal at least partially according to a difference between the output voltage and an input voltage at the converter input node;
  a summing circuit providing a compensated error signal at least partially according to a summation of the error output signal and the slope compensation signal; and
  a comparator circuit, including a first comparator input coupled to receive the compensated error signal from the summing circuit, a second comparator input coupled to receive the current sense signal, and a comparator output providing a pulse width modulation comparison signal according to a comparison of the compensated error signal with the current sense signal;
  wherein the modulator circuit is operative to provide the at least one pulse width modulation control signal to the switching control circuit at least partially according to the pulse width modulation comparison signal.

10. The control circuit of claim 7, wherein the modulator circuit comprises:
- a first switching circuit operative according to the mode control signal to selectively provide an inverted sensing signal or a non-inverted sensing signal representing an inductor current flowing in the DC to DC converter;
- a current sense amplifier with inputs coupled to the first switching circuit and an output operative to provide a current sense signal according to the inverted or non-inverted sensing signal from the first switching circuit;
- an error amplifier circuit providing an error output signal at least partially according to comparison of the feedback signal with the reference signal,
- a slope compensation circuit providing a slope compensation signal at least partially according to a difference between the output voltage and an input voltage at the converter input node;
- a summing circuit providing a compensated error signal at least partially according to a summation of the error output signal and the slope compensation signal; and
- a comparator circuit, including a first comparator input coupled to receive the compensated error signal from the summing circuit, a second comparator input coupled to receive the current sense signal, and a comparator output providing a pulse width modulation comparison signal according to a comparison of the compensated error signal with the current sense signal;
- wherein the modulator circuit is operative to provide the at least one pulse width modulation control signal to the switching control circuit at least partially according to the pulse width modulation comparison signal.

11. The control circuit of claim 10, wherein the slope compensation circuit comprises:
- a slope compensation circuit amplifier with first and second amplifier inputs, and an output;
- a ramp circuit providing the slope compensation signal according to the output of the slope compensation circuit amplifier; and
- a second switching circuit operative according to the mode control signal to selectively couple a signal representing the output voltage to one of the first and second amplifier inputs, and to selectively couple a signal representing the input voltage to the other one of the first and second amplifier inputs.

12. A method of controlling a four-switch cascaded buck boost DC to DC converter to provide an output voltage by converting an input voltage, the method comprising:
- selectively operating the converter in a buck mode according to a mode control signal by pulse width modulating first high and low side switches in complementary fashion to provide buck conversion, while turning on a second high side switch and turning off a second low side switch;
- selectively operating the converter in a boost mode according to the mode control signal by pulse width modulating the second high and low side switches in complementary fashion while turning on the first high side switch and turning off the first low side switch;
- operating the converter in the buck mode using a first one of valley current control and peak current control, and in the boost mode using the other of peak current control and valley current control;
- operating the converter in the buck mode to provide subtractive slope compensation, and in the boost mode to provide additive slope compensation, with a slope compensation magnitude based on a difference between the output voltage at the converter output node and an input voltage at the converter input node
- generating the mode control signal
  - to change from the buck mode to the boost mode responsive to a determination that the on time of the second switch is less than a first threshold, and
  - to provide the mode control signal to change from the boost mode to the buck mode responsive to a determination that the on time of the fourth switch is less than a second threshold,
  - such that the slope compensation magnitude is similar for each mode.

13. The method of claim 12:
- wherein, in the buck mode, pulse width modulating the first high and low side switches for buck conversion comprises controlling at least one of an on-time and an off-time associated with the first high side switch using valley current control at least partially according to a comparison of a feedback signal associated with the output voltage of the converter and a reference signal representing a desired output voltage; and
- wherein, in the boost mode, pulse width modulating the second high and low side switches for boost conversion comprises controlling at least one of an on-time and an off-time associated with the second high side switch of the boost converter stage using peak current control at least partially according to the comparison of the feedback signal and the reference signal.

14. The converter of claim 1, wherein the modulator circuit is operative in the buck mode to provide the at least one pulse width modulation control signal using valley current control, and in the boost mode to provide the at least one pulse width modulation control signal using peak current control.

15. The control circuit of claim 7, wherein the first and second thresholds are approximately equal.

16. The method of claim 12, wherein the first and second thresholds are approximately equal.

* * * * *